(12) United States Patent  
Hayasaka et al.

(10) Patent No.: US 8,681,123 B2  
(45) Date of Patent: Mar. 25, 2014

(54) INPUT/OUTPUT DEVICE (75) Inventors: Kengo Hayasaka, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 12/461,173

(22) Filed: Aug. 4, 2009

(65) Prior Publication Data

US 2010/0053119 A1    Mar. 4, 2010

(30) Foreign Application Priority Data

Aug. 29, 2008   (JP) ................................ 2008-221815

(51) Int. Cl.  
  *G06F 3/042* (2006.01)
(52) U.S. Cl.  
  USPC .......................................................... 345/175
(58) Field of Classification Search  
  USPC .......................................... 345/166, 173, 175  
  See application file for complete search history.

(56) References Cited

U.S. PATENT DOCUMENTS

| | | | |
|---|---|---|---|
| 7,034,866 B1 * | 4/2006 | Colmenarez et al. | .... 348/211.12 |
| 2005/0185084 A1 * | 8/2005 | Nonaka et al. | ................. 348/345 |
| 2006/0007222 A1 * | 1/2006 | Uy | ................................. 345/207 |
| 2008/0106629 A1 * | 5/2008 | Kurtz et al. | ............... 348/333.01 |
| 2008/0117183 A1 * | 5/2008 | Yu et al. | ......................... 345/173 |
| 2010/0225564 A1 | 9/2010 | Tomisawa et al. | |

FOREIGN PATENT DOCUMENTS

| | | |
|---|---|---|
| JP | 10-334244 A | 12/1998 |
| JP | 2005-141102 A | 6/2005 |
| JP | 2007-086931 A | 4/2007 |
| WO | WO-2007-097225 A1 | 8/2007 |

OTHER PUBLICATIONS

Japanese Office Action issued Jun. 5, 2012 for corresponding Japanese Application No. 2008-221815.

* cited by examiner

*Primary Examiner* — Alexander S Beck  
*Assistant Examiner* — Tony N Ngo  
(74) *Attorney, Agent, or Firm* — Rader, Fishman & Grauer PLLC (57) ABSTRACT

An input/output device capable of displaying a high-resolution two-dimensional image and detecting the position of an object in three-dimensional space in spite of having a low profile is provided. An input/output device includes: a display section including, in a mixed manner, image pickup regions for obtaining image pickup data of an object and a display region for displaying an image based on image data; a microlens arranged on a display surface of the display section so as to correspond to each of the image pickup regions; and a position detection section detecting position of the object based on image pickup data obtained from the image pickup regions of the display section.

20 Claims, 9 Drawing Sheets

INPUT/OUTPUT DEVICE

BACKGROUND OF THE INVENTION

1. Field of the Invention

The present invention relates to an input/output device used for, for example, a touch panel or the like, and capable of inputting and outputting an image.

2. Description of the Related Art

In related art, an input/output device capable of inputting and outputting an image in three-dimensional space has been proposed as described in Japanese Unexamined Patent Application Publication No. 2007-86931. In Japanese Unexamined Patent Application Publication No. 2007-86931, a microlens array is arranged on a display surface side of a display at a distance equal to the focal length of the microlens array from the display surface, thereby three-dimensional display by a so-called integral system is achieved. In such a technique, in a plurality of pixels forming the display, the number of pixels allocated to one microlens corresponds to the resolution in a depth direction of a three-dimensional image, and the number of microlenses corresponds to the number of pixels on a two-dimensional plane of the three-dimensional image.

SUMMARY OF THE INVENTION

In other words, in a technique in Japanese Unexamined Patent Application Publication No. 2007-86931, the resolution on a two-dimensional plane of a three-dimensional image is determined depending on the number of microlenses (a lens pitch) in a microlens array. As a result, the resolution is low due to restrictions by the lens pitch.

Therefore, an input/output device of displaying a pseudo-stereoscopic image by arranging a microlens array on a display surface side of a display so as to have an optically conjugate positional relationship between the display surface of the display and one plane in space, thereby to display a two-dimensional image on the one plane in space has been proposed as described in Japanese Unexamined Patent Application Publication No. 2005-141102. In such a configuration, the resolution of the image displayed on the one plane in space is adjusted by a pitch between display pixels in the display and the imaging magnification of a microlens, so a high-resolution image is easily displayed.

However, in the configuration in Japanese Unexamined Patent Application Publication No. 2005-141102, a position detection sensor detecting the position of a finger or the like is arranged forward of an image display surface (on a viewer's side), so there is an issue that the thickness of the whole device is increased.

It is desirable to provide an input/output device displaying a high-resolution two-dimensional image and being capable of detecting the position of an object in three-dimensional space in spite of having a low profile.

According to an embodiment of the invention, there is provided an input/output device including: a display section including, in a mixed manner, image pickup regions for obtaining image pickup data of an object and a display region for displaying an image based on image data; a microlens arranged on a display surface of the display section so as to correspond to each of the image pickup regions; and a position detection section detecting position of the object based on image pickup data obtained from the image pickup regions of the display section.

In the input/output device according to the embodiment of the invention, when an image is displayed on the display region of the display section, image light is emitted to above the display section. At this time, when the object approaches above the display section, the above-described image light is applied to the object, and the applied light is condensed by the microlens, and then is received in the image pickup regions. Thereby, in the image pickup regions, image pickup data of the object keeping information on the traveling direction of a light ray is obtained. In the position detection section, the position of the object is detected based on the image pickup data obtained in such a manner.

In the input/output device according to the embodiment of the invention, the display region and image pickup regions are arranged in a mixed manner in the display section, so compared to the case where a position sensor for detecting the position of an object is arranged forward of a display surface, the thickness of the whole device is reduced. Moreover, the microlens is arranged corresponding to each of the image pickup regions, so compared to the case where a three-dimensional image is displayed by a microlens array including microlenses on the whole surface of the display section, a high-resolution two-dimensional image is displayed. On the other hand, image pickup data keeping information on the traveling direction of a light ray is obtainable, so in the position detection section, not only a two-dimensional plane of an object but also the position in a height direction of the object is detectable based on such image pickup data. Therefore, the input/output device is allowed to display a high-resolution two-dimensional image and detect the position of an object in three-dimensional space in spite of having a low profile.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
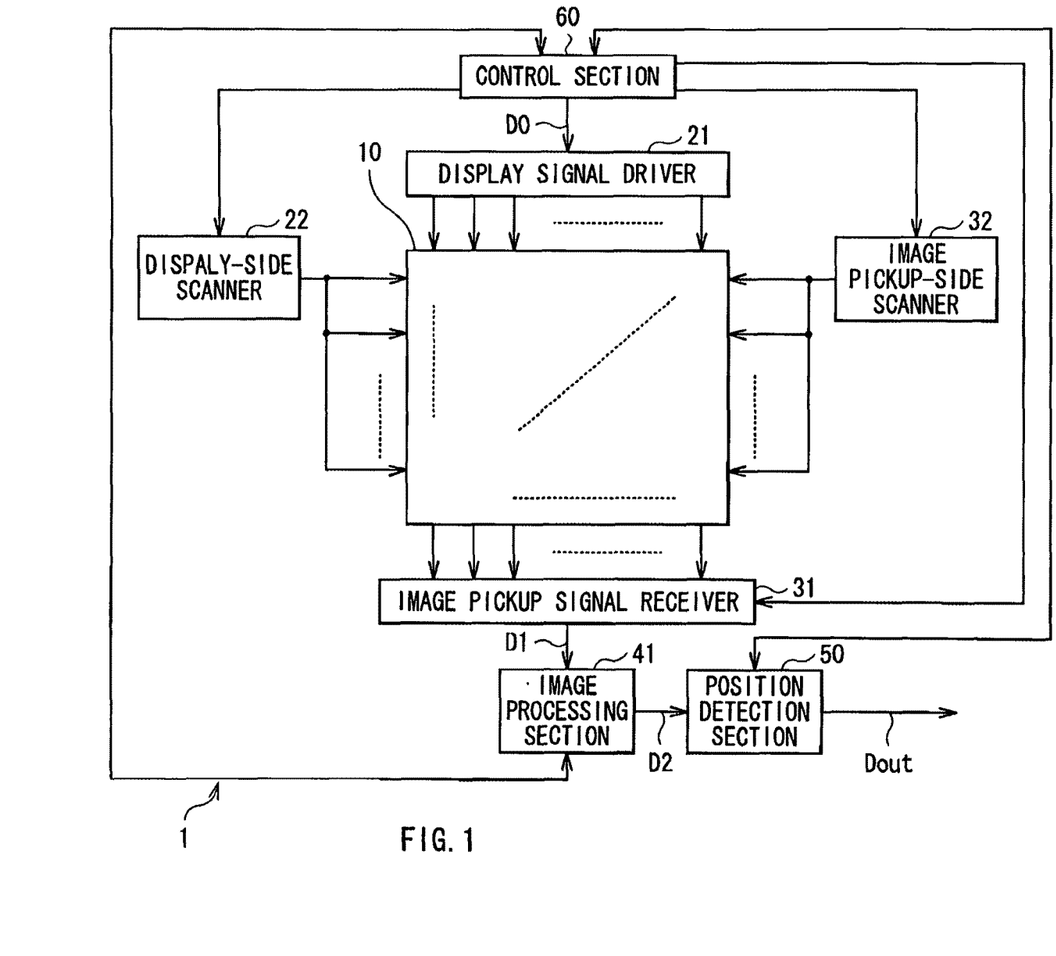
FIG. 1 is a functional block diagram of the whole configuration of an input/output device according to an embodiment of the invention.

FIG. 1 illustrates a functional block diagram of an input/output device 1 according to an embodiment of the invention. The input/output device 1 is used as, for example, a touch panel, and displays an image such as a graphic form or a character, and picks up an image of an object such as, for example, a finger to allow detection (sensing) of the position of the object. The input/output device 1 includes an input/output panel 10, a display signal driver 21, a display-side scanner 22, an image pickup signal receiver 31, an image pickup-side scanner 32, an image processing section 40, a position detection section 50 and a control section 60.

The input/output panel 10 includes a lens substrate 12 which will be described later on a display side, that is, a viewer's side of a display section 11 in which a plurality of pixels are arranged in a matrix form on the whole surface thereof. The configuration of the input/output panel 10 will be described in detail later.

The display signal driver 21 and the display-side scanner 22 drive each display pixel in the display section 11 which will be described later in response to the control of the control section 60 to perform display based on a display signal (image data D0). The display signal driver 21 drives each display pixel subjected to display drive, and the display-side scanner 22 selects the display pixel subjected to display drive.

The image pickup signal receiver 31 and the image pickup-side scanner 32 drive each image pickup pixel in the display section 11 which will be described later in response to the control of the control section 60 to receive light from the object thereon, and then obtain image pickup data D1 of the object. The image pickup signal receiver 31 drives image pickup pixels subjected to image pickup drive, and the image pickup-side scanner 32 selects the image pickup pixels subjected to image pickup drive.

The image processing section 40 performs predetermined image processing on the image pickup data D1 supplied from the image pickup signal receiver 31 in response to the control of the control section 60 to produce image processing data D2. The image processing operation of the image processing section 40 will be described in detail later.

The position detection section 50 detects the position (x, y, z) of a finger based on the image processing data D2 inputted from the image processing section 40 in response to the control of the control section 60. Information on the position of the finger detected by the position detection section 50 is outputted as position data Dout.

The control section 60 controls the operations of the display signal driver 21, the display-side scanner 22, the image pickup-side scanner 32, the image pickup signal receiver 31, the image processing section 40 and the position detection section 50. More specifically, the control section 60 appropriately controls display drive operation of the display signal driver 21 and the display-side scanner 22, image pickup drive operation of the image pickup signal receiver 31 and the image pickup-side scanner 32, image processing operation of the image processing section 40 and position detecting operation of the position detection section 60. In addition, the above-described image processing section 40, the above-described position detection section 50 and the above-described control section 60 each include, for example, a microcomputer or the like.

Figure 2:
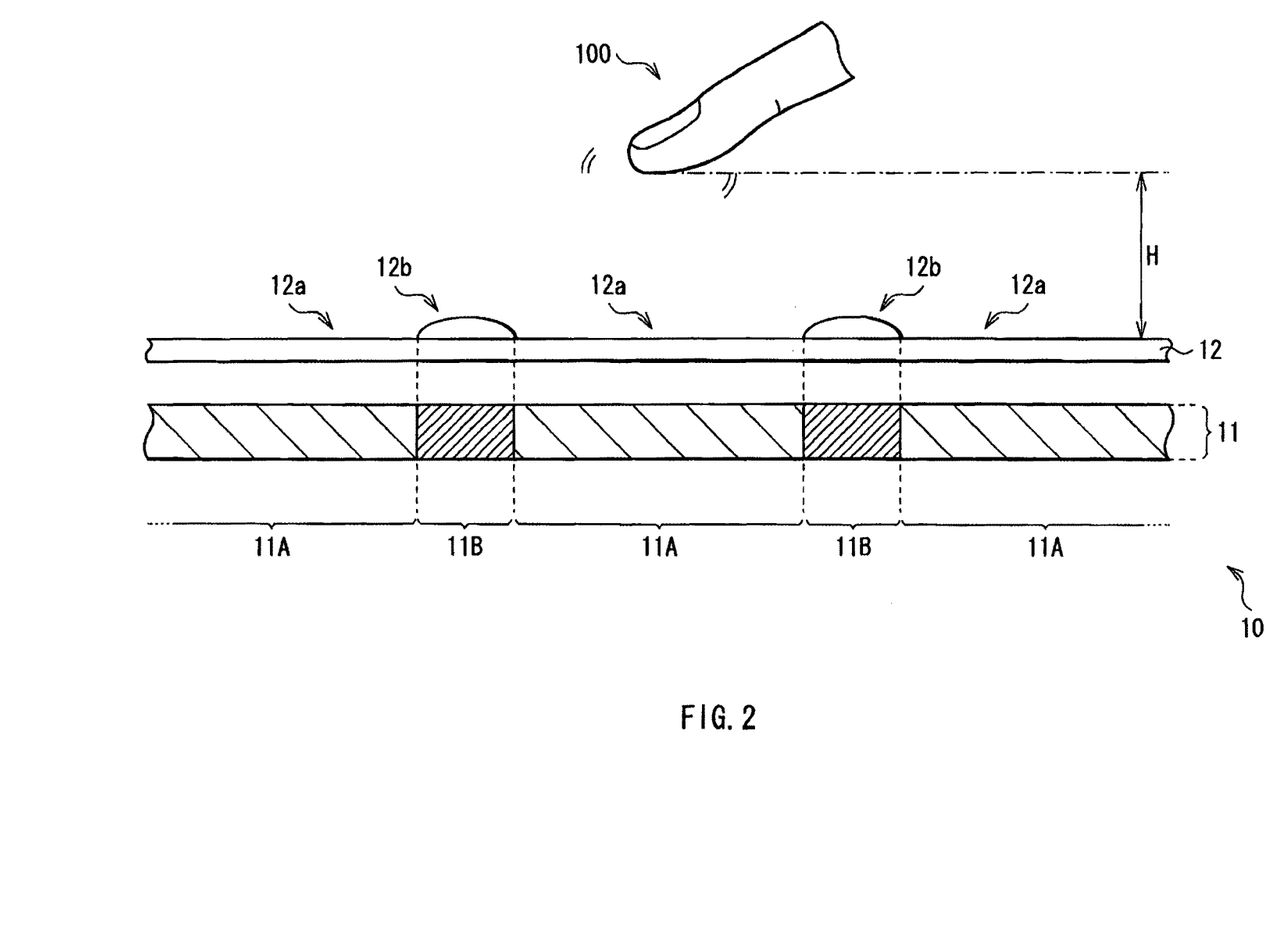
FIG. 2 is a schematic sectional view of a brief configuration of an input/output panel illustrated in FIG. 1.
Figure 3:
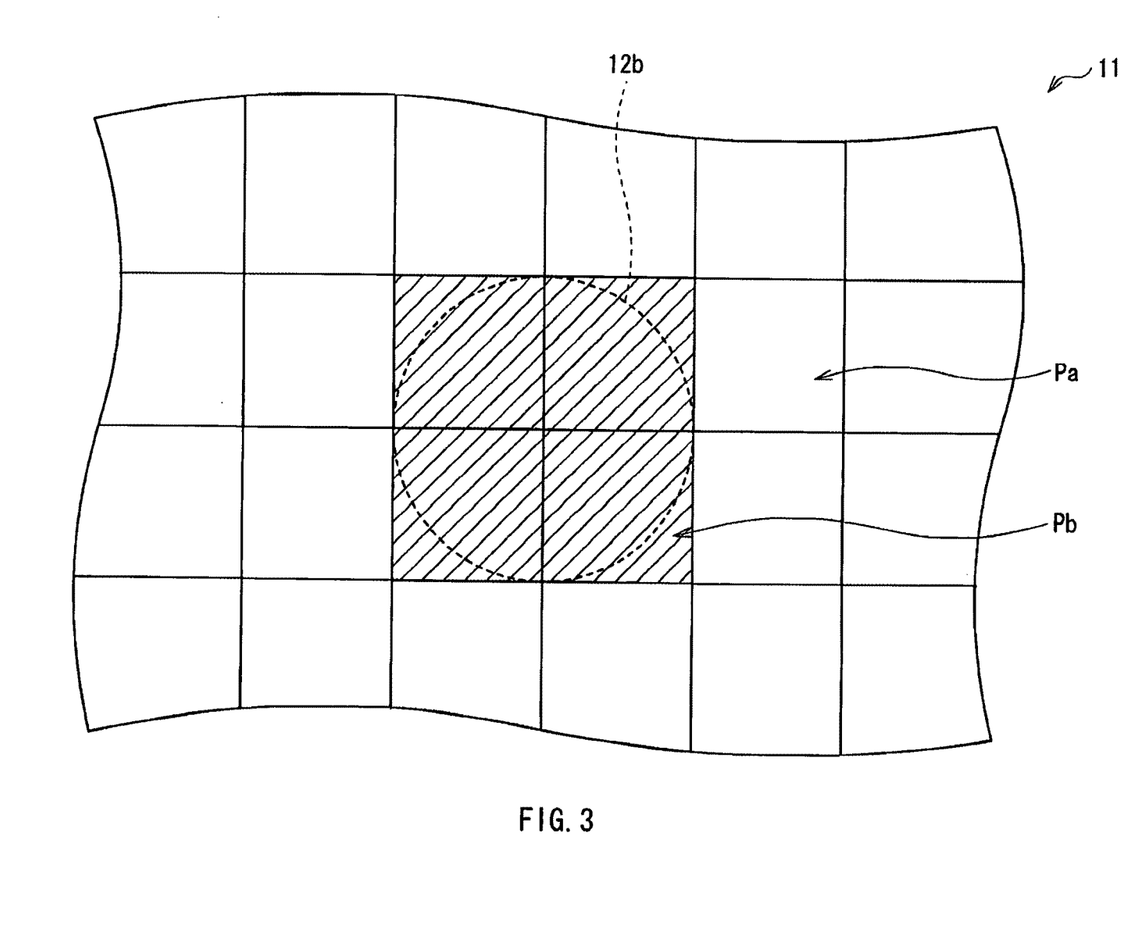
FIG. 3 is a schematic view of a two-dimensional configuration of a display section in FIG. 1.

Next, referring to FIGS. 2 and 3, the configuration of the input/output panel 10 will be described in detail below. FIG. 2 illustrates a schematic sectional view of the input/output panel 10, and FIG. 3 illustrates a schematic plan view of the display section 11.

In the display section 11, display regions 11A including display pixels Pa and image pickup regions 11B including image pickup pixels Pb are arranged on a drive substrate (not illustrated) in a mixed manner. The drive substrate drives both of the display pixels Pa and the image pickup pixels Pb, and is made of, for example, a TFT (Thin Film Transistor) or the like.

The display pixels Pa are display elements displaying an image based on the image data D0. The display pixels Pa are made of, for example, liquid crystal display elements (LCDs: liquid crystal displays). The liquid crystal display elements each includes, for example, a backlight, a liquid crystal cell including a liquid crystal layer sealed between a pair of substrates, a pair of polarizing plates bonded to the liquid crystal cell on a light incident side and a light emission side, and a color filter selectively allowing light in a specific wavelength region of light emitted from the liquid crystal cell to pass therethrough (all not illustrated). The backlight is made of, for example, a CCFL (a Cold Cathode Fluorescent Lamp), an LED (Light Emitting Diode) or the like. In such a configuration, when a voltage is applied to the pair of substrates in the liquid crystal cell, light emitted from the backlight based on the image data D0 is modulated, and is allowed to pass though the liquid crystal cell.

The image pickup pixels Pb obtain image pickup data D1 based on light condensed by microlens sections 12b of the lens substrate 12. The image pickup pixels Pb are made of, for example, CCDs (Charge Coupled Devices), CMOSs (Complementary Metal Oxide Semiconductors) or the like.

The lens substrate 12 includes the microlens sections 12b in a plurality of positions separated from one another on a substrate made of glass or the like. In the lens substrate 12, parts other than the microlens sections 12b are flat sections 12a.

Each display region 11A of the display section 11 is arranged opposed to each flat section 12a of the lens substrate 12, and each image pickup region 11B is arranged opposed to each microlens section 12b. For example, as illustrated in FIG. 3, a plurality of image pickup regions 11B are arranged at predetermined intervals, and each image pickup region 11B includes 2×2=4 image pickup pixels Pb. In other words, the microlens sections 12b are arranged only opposed to the image pickup regions 11B.

Next, functions and effects of the above-described input/output device 1 will be described below.

Image Display Operation

First, image display operation (output operation) of the input/output device 1 will be described below. In the input/output device 1, when the image data D0 is supplied to the display signal driver 21 in response to the control of the control section 60, each of the display pixels Pa is driven to display an image in the display region 11A. Image light of the displayed image passes through the flat sections 12a of the lens substrate 12 to be emitted to above the lens substrate 12.

Sensing Operation

Figure 4A:
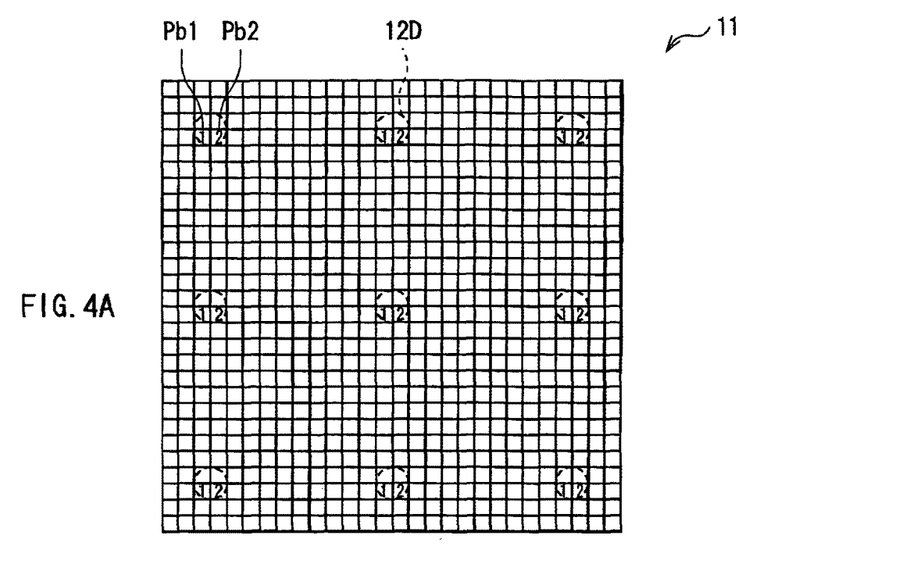
FIGS. 4A to 4C are schematic views for describing parallax image producing operation of an image processing section illustrated in FIG. 1.
Figure 4B:
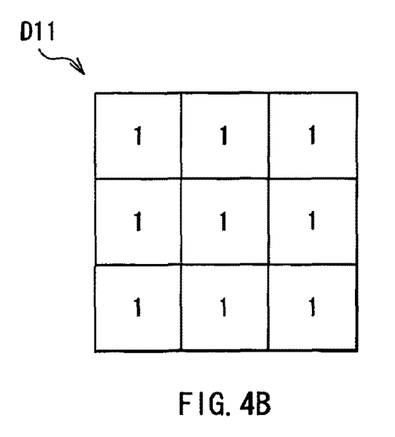
Figure 4C:
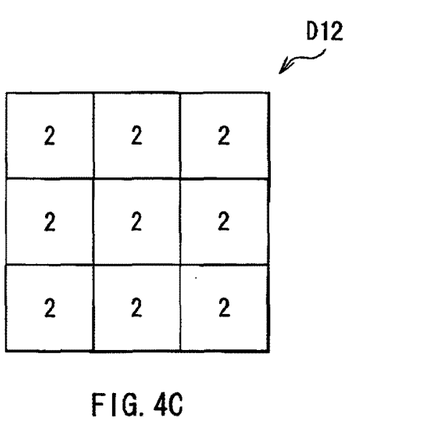
Figure 5A:
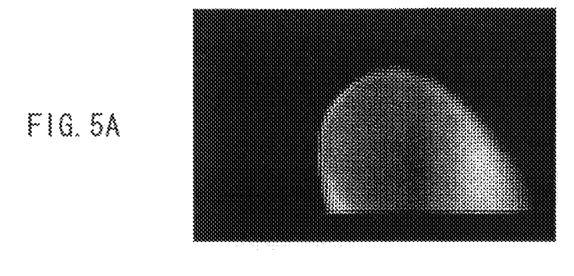
FIG. 5A is an actually picked-up image.
Figure 5B:
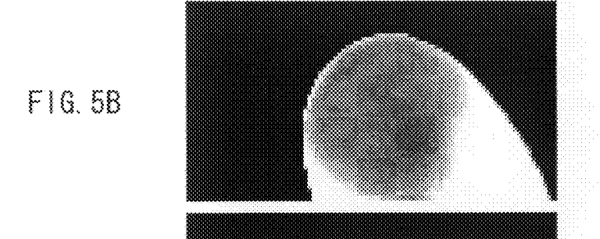
FIGS. 5B and 5C are parallax images.
Figure 5C:
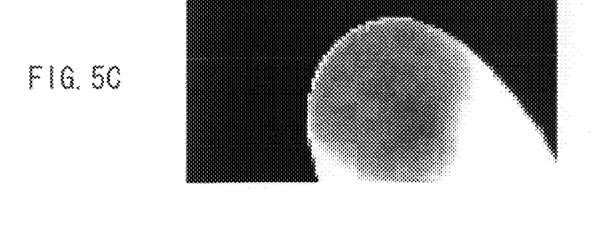
Figure 6A:
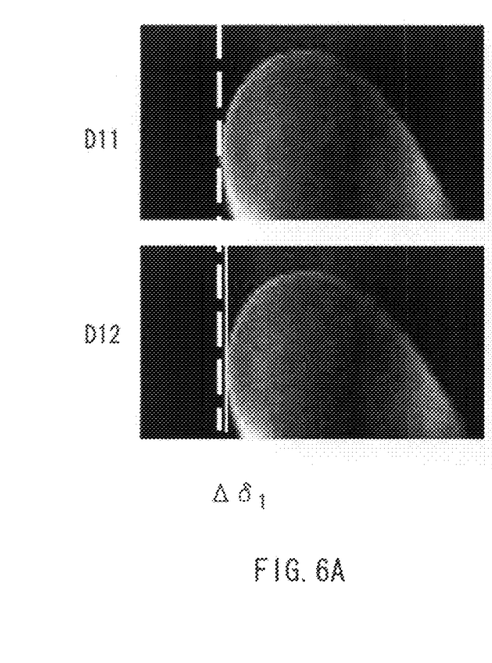
FIGS. 6A to 6C are schematic views for describing position detecting operation of a position detection section illustrated in FIG. 1.
Figure 6B:
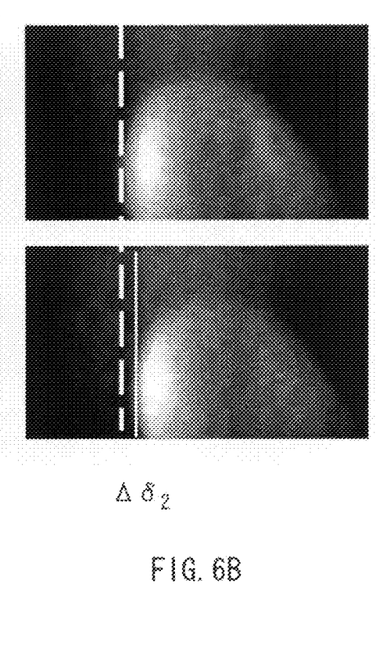
Figure 6C:
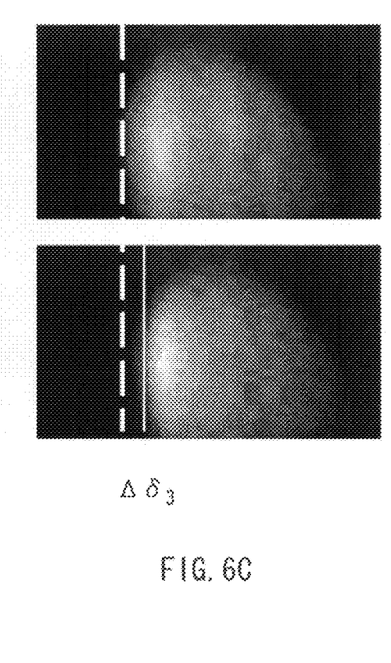

Next, sensing operation (input operation) of the input/output device 1 will be described referring to FIGS. 1 to FIGS. 6A to 6C. FIGS. 4A to 4C are schematic views for describing parallax image producing operation in the image processing section 40. FIGS. 5A to 5C are an actually picked-up image of a finger, and parallax images produced from the picked-up image. FIGS. 6A to 6C are illustrations for describing position detecting operation.

In the input/output device 1, when a finger 100 is placed above the input/output panel 10, the finger 100 is irradiated with the above-described image light. The light applied to the finger 100 is condensed by the microlens sections 12b in the lens substrate 12, and then is received in the image pickup regions 11B (the image pickup pixels Pb). Thereby, image pickup data of the finger 100 is obtained, and is outputted to the image pickup signal receiver 31. The image pickup data outputted to the image pickup signal receiver 31 is supplied to the image processing section 40 as the image pickup data D1.

In this case, in each image pickup region 11B, the traveling directions of light rays received by the image pickup pixels Pb are different from one another, and the light rays keeping information on the traveling directions are received. Moreover, image pickup pixel data in the image pickup pixels Pb located at the same position in the image pickup regions 11B include information on the same traveling direction.

The image processing section 40 performs a parallax image producing process based on the inputted image pickup data D1 to produce two parallax image data D11 and D12 of the finger 100. More specifically, first, image pickup pixel data in the image pickup pixels Pb1 located at the same position in the image pickup regions 11B (for example, pixel data at positions indicated by a reference numeral 1 in FIG. 4A) are extracted from the image pickup data D1, and the extracted image pickup pixel data are synthesized to produce parallax image data D11 illustrated in FIG. 4B. Likewise, image pickup pixel data in the image pickup pixels Pb2 (pixel data at positions indicated by a reference numeral 2 in FIG. 4A) are extracted, and the extracted image pickup pixel data are synthesized to produce parallax image data D12 illustrated in FIG. 4C.

The produced parallax image data D11 and D12 are subjected to another image processing, for example, a defect correction process or a noise reduction process as necessary, and then the parallax image data D11 and D12 are outputted to the position detection section 50 as image processing data D2.

The position detection section 50 detects the position (x, y, z) of the finger 100 based on the inputted image processing data D2. For example, the position (x, y) of the finger 100 is detected by performing an edge detection process on one parallax image data (the parallax image data D11 or the parallax image data D12) of the finger 100. On the other hand, the z component (height H) of the position of the finger 100 is specified by, for example, the following technique. A phase difference between living body images in two parallax images is calculated based on a correlation between the parallax image data D11 and D12, and the z component of the finger 100 is specified based on the phase difference. FIGS. 6A to 6C illustrate parallax images corresponding to the parallax image data D11 and D12 in the case where the height H is 0 mm, 5 mm and 10 mm. As illustrated in FIGS. 6A to 6C, phase differences ($\Delta\delta_1$, $\Delta\delta_2$ and $\Delta\delta_3$) between the phases of the finger 100 in the two parallax images are detected by, for example, the edge detection process. At this time, it is obvious that as the height H of the finger 100 is reduced, the phase difference between the phases of the finger 100 in the two parallax images is reduced. ($\Delta\delta_3 > \Delta\delta_2 > \Delta\delta_1$). Therefore, when the phase difference between the phases of the finger 100 in two parallax images is detected based on the correlation between the two parallax images, the z component of the finger 100 is specified.

Moreover, for example, a plurality of parallax image data of the finger 100 are successively produced, and the edge detection process is performed on each of the plurality of parallax image data to calculate the movement amount of the finger 100, thereby the movement of the finger 100 in a horizontal plane (in an XY plane) may be detected.

Information on the position (x, y, z) of the finger 100 detected in the position detection section 50 in such a manner is outputted to outside as position data Dout. On the other hand, in the input/output device 1, when function operation which is executed in response to the position of the finger 100 is set in advance, desired function operation is executed in response to the outputted position data Dout. Alternatively, the position data Dout may be inputted to the display signal driver 21 as the above-described image data D0.

As described above, in the embodiment, the display regions 11A and the image pickup regions 11B are arranged in the display section 11 in a mixed manner, so compared to the case where a position sensor for detecting the position of the finger 100 is separately arranged forward of the display surface, the thickness of the whole device is reduced. Moreover, the flat sections 12a of the lens substrate 12 are arranged opposed to the display regions 11A, so compared to the case where a three-dimensional image is displayed through the microlens array, a high-resolution two-dimensional image is displayed. On the other hand, the microlens sections 12b of the lens substrate 12 are arranged opposed to the image pickup regions 11B, so image pickup data keeping information on the traveling direction of a light ray is obtained. Therefore, the position detection section 50 is allowed to detect not only a two-dimensional plane of the finger 100 but also the position in a height direction of the finger 100. Therefore, in spite of having a low profile, the input/output device 1 displays a high-resolution two-dimensional image, and detects the position of an object in three-dimensional space.

Figure 7:
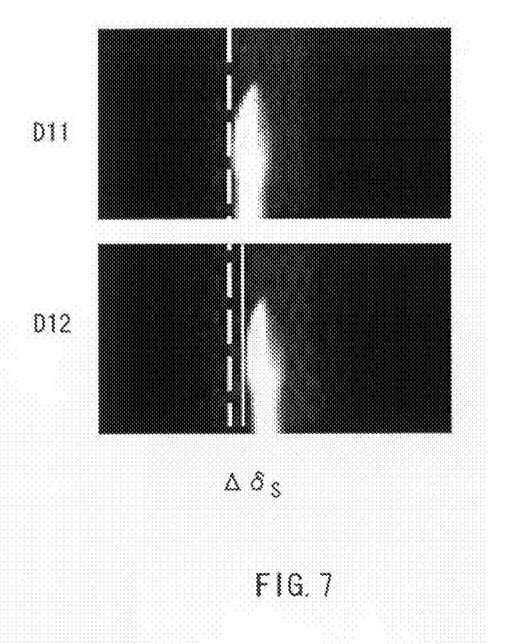
FIG. 7 is parallax images of a stylus.

In addition, in the above-described embodiment, the case where the position of the finger 100 is detected is described as an example. However, an object subjected to position detection is not limited to the finger, and may be any other object such as other parts of a living body or a stylus. FIG. 7 illustrates two parallax images produced based on image pickup data of the stylus. Also in this case, the position (z, y, z) of the stylus is detectable by detecting a phase difference $\Delta\delta s$ between the phases of the stylus in the two parallax images. Therefore, three-dimensional sensing using not only the finger but also the stylus is allowed.

APPLICATION EXAMPLE 1

Figure 8:
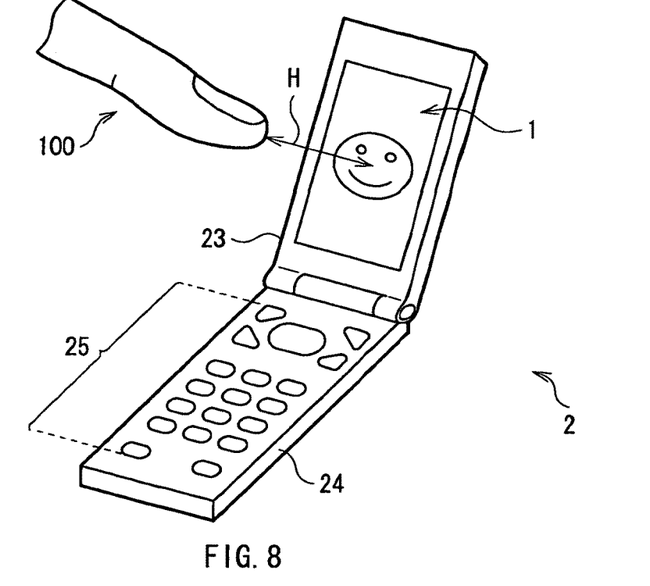
FIG. 8 is a perspective view of a brief configuration of a cellular phone according to an application example of the input/output device illustrated in FIG. 1.

FIG. 8 illustrates a brief configuration of a cellular phone 2 according to Application Example 1 of the above-described embodiment. The cellular phone 2 includes a flip-type enclosure (a first enclosure 23 and a second enclosure 24), and the input/output device 1 is arranged in the first enclosure 23. On the other hand, in the second enclosure 24, an operation section 25 for performing input operation is arranged.

In the application example, the input/output device 1 is mounted, thereby the input/output device 1 is allowed to function as a touch panel from which the input operation is performed in response to the position of the finger 100 of a user. More specifically, when the z component of the position of the finger 100 is detected, input by click operation is allowed. Moreover, when the frequency of occurrences of contact by the finger 100 in a certain period is measured, input by double-click operation is allowed. Further, when the movement of the finger 100, that is, a change in the position (x, y) is detected, the input/output device 1 may function as a mouse pointer.

In addition, an apparatus to which the input/output device 1 is applied is not limited to the above-described cellular phone, and the input/output device 1 is applicable to, for example, various mobile devices such as a notebook type PC (Personal Computer).

APPLICATION EXAMPLE 2

Figure 9:
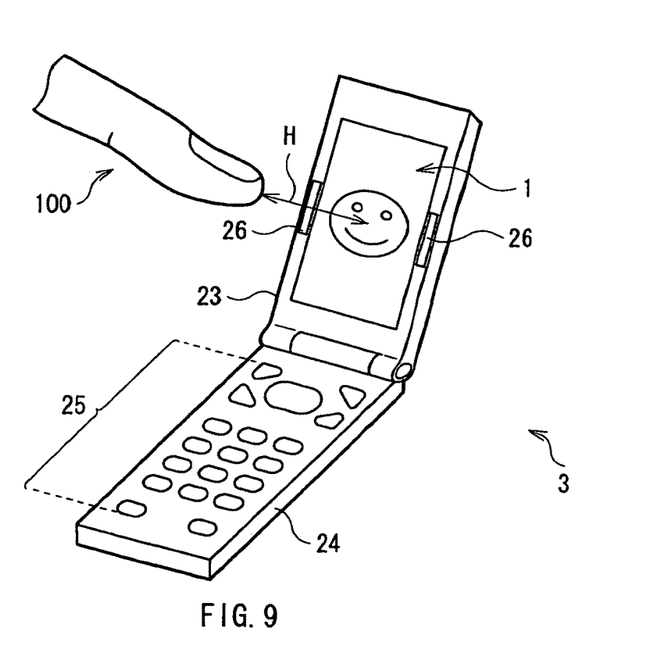
FIG. 9 is a perspective view of a brief configuration of a cellular phone according to a modification.

FIG. 9 illustrates a brief configuration of a cellular phone 3 according to Application Example 2 of the above-described embodiment. The cellular phone 3 in the application example has the same configuration of the cellular phone 2 according to the above-described Application Example 1, except that light sources 26 are arranged. The light sources 26 are arranged at both sides of the input/output device 1 in the first enclosure 23, and are made of, for example, LEDs or the like. In the above-described embodiment and Application Example 1, the case where the finger 100 is irradiated with displayed image light is described as an example, but as in the case of the application example, the light sources 26 for sensing may be separately arranged. Thereby, three-dimensional sensing of the finger 100 is allowed, for example, even under circumstances where an image is not displayed.

Although the present invention is described referring to the embodiments and the modifications, the invention is not limited thereto, and may be variously modified. For example, in the above-described embodiment and the like, in the image processing section 40, two parallax image data are produced based on the image pickup data D1 However, the number of produced parallax image data is not limited to two, and may be three or more. Moreover, in the above-described embodiment and the like, the case where each image pickup region 11B includes 2×2=4 image pickup pixels Pb is described as an example. However, as the number of image pickup pixels allocated to each image pickup region 11B, two is enough, and three, or five or more image pickup pixels may be allocated to each image pickup region 11B.

Figure 10A:
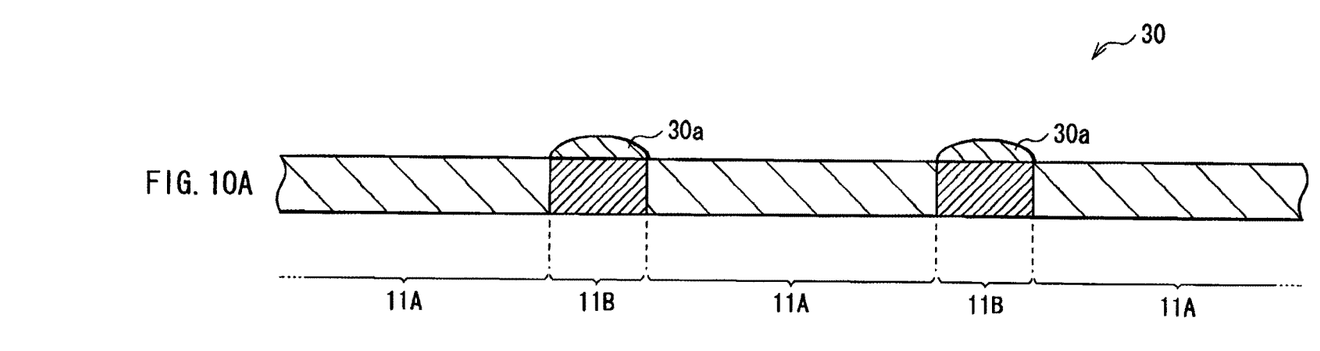
FIGS. 10A and 10B are schematic sectional views of another example of the input/output panel illustrated in FIG. 1.
Figure 10B:
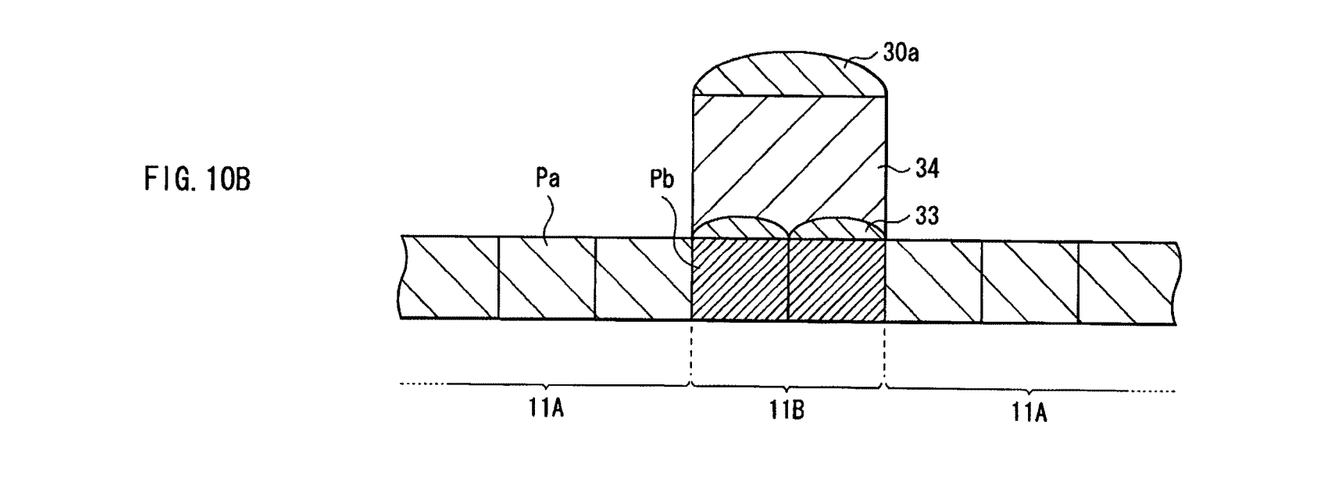

Further, in the above-described embodiment and the like, a configuration using the lens substrate 12, that is, a configuration in which the microlens sections 12b are arranged on the substrate together with the flat sections 12a is described as an example. However, the microlens sections 12b are not necessarily arranged on the substrate. For example, an input/output panel 30 illustrated in FIG. 10A may be used. In the input/output panel 30, the display regions 11A and the image pickup regions 11B are included in a panel plane in a mixed manner, and microlenses 30a (microlens sections) are integrally arranged with the image pickup regions 11B only on the image pickup regions 11B. In this case, FIG. 10B illustrates an enlarged view around one image pickup region 11B. The image pickup region 11B includes, for example, 2×2 image pickup pixels Pb, and an on-chip lens 33 for efficiently condensing a received light ray is arranged on a light-sensing plane of each image pickup pixel Pb. The microlens 30a is formed on the on-chip lenses 33 with, for example, a resin layer 34 in between. As described above, the lens substrate including the microlenses is not necessarily used, and the microlens 30a may be formed directly on the image pickup region 11B of the panel. Even in such a configuration, the same effects as those of the embodiment of the invention are obtainable.

In the above-described embodiment and the like, the liquid crystal display element is described as an example of the display pixel Pa. However, any other display element, for example, a self-luminous element such as an organic or inorganic EL (Electro Luminescence) element may be used. However, in the case where the self-luminous element is used, the backlight may not be specifically arranged.

The present application contains subject matter related to that disclosed in Japanese Priority Patent Application JP 2008-221815 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input/output device comprising:
a display section in a form of a flat panel and including, in a mixed manner, image pickup regions for obtaining image pickup data of an object and display regions for displaying an image based on image data, each image pickup region having located therein two contiguous image pixel locations with each image pixel location containing an image pickup pixel, each image pickup region being isolated from the other image pickup regions and immediately surrounded by the display regions;
a lens substrate facially opposed to the display section and having a flat section in which microlens sections are interspersed, the lens substrate arranged on a display surface of the display section so that each of the image pickup regions corresponds to one of the microlens sections and each of the display regions corresponds to the flat section such that each microlens section is immediately surrounded in all directions as viewed in planar view by portions of the flat section to which the display regions correspond;
an image processing section performing image processing on image pickup data obtained from the image pickup regions to produce two parallax image data from respective ones of the image pickup pixels in the contiguous image pixel locations of the image pickup regions; and
a position detection section detecting a three-dimensional x-y-z position of the object based on image pickup data obtained from the image pickup regions of the display section,
wherein an x-y position of the three-dimensional x-y-z position is detected by performing an edge detection process on one of the two parallax image data and a z position of the three-dimensional x-y-z position is determined based upon a phase difference between the two parallax image data by calculating a correlation therebetween,
wherein, when the image is displayed on the display section from the display regions, image light is emitted therefrom and, when the object approaches the display section as the image light is being emitted therefrom, the image light is applied to the object and reflects therefrom as reflected light and
wherein the reflected light from the object is received and condensed by the microlens sections for processing by the image processing section.

2. The input/output device according to claim 1, wherein each microlens section includes a microlens and the microlens is integrally arranged with the image pickup regions on the image pickup regions of the display section.

3. The input/output device according to claim 1, wherein in the display section, the image pickup regions are arranged in a plurality of positions separated from one another, and
each of the image pickup regions includes two or more image pickup pixels.

4. The input/output device according to claim 3, wherein the image processing section extracts image pickup pixel data from the image pickup data, each of the image pickup pixel data corresponding to each of the image pickup pixel located at the same position in the image pickup regions, and then synthesizes the image pickup pixel data to produce the two parallax image data.

5. An electronic apparatus comprising the input/output device of claim 1.

6. An input/output device, comprising:
a display panel in a form of a flat panel and including a plurality of image pickup regions and a plurality of display regions interspersed among one another, each of the plurality of image pickup region being isolated from the others of the plurality of image pickup regions and surrounded by ones of the plurality of display regions, the plurality of image pickup regions operative for obtaining image pickup data of an object, the plurality of display regions operative for displaying an image based on image data, each one of the image pickup regions having located therein at least two contiguous image pixel locations with each one of the image pixel locations containing an image pickup pixel;
a lens panel having a flat lens panel portion and a plurality of microlenses integrally formed thereon and projecting therefrom to form flat sections surrounding each of the plurality of microlenses as viewed in planar view, the lens panel arranged on a display surface of the display panel so that each of the plurality of microlens sections corresponds to one of the plurality of image pickup regions and each of the flat sections corresponds to one of the plurality of display regions; and
a processor operative for performing image processing on image pickup data obtained from the image pickup regions including producing at least two parallax image data from the image pickup pixels in the contiguous pixel locations of each one of the image pickup regions and for detecting a three-dimensional x-y-z position of the object based on the image pickup data such that an x-y position of the three-dimensional x-y-z position is detected by employing one of the at least two parallax image data and a z position of the three-dimensional x-y-z position is determined based upon calculating a phase difference between the at least two parallax image data from the image pickup pixels in the contiguous pixel locations of each one of the image pickup regions,
wherein, when the image is displayed on the display panel from the plurality of display regions, image light is emitted therefrom and, when the object approaches the display panel as the image light is being emitted therefrom, the image light is applied to the object and reflects therefrom as reflected light and
wherein the reflected light from the object is received and condensed by the plurality of microlenses for processing by the processor.

7. An electronic apparatus comprising the input/output device of claim 6.

8. An input/output device comprising:
a pixel substrate on which a plurality of pixels are two-dimensionally arrayed in a pixel region, the plurality of pixels including light-emitting pixels configured to display an image and light-sensing pixels configured to image a scene including an object, the light-sensing pixels being disposed in groups interspersed throughout the pixel region such that each group of light-sensing pixels is isolated from each other group of light-sensing pixels with light-emitting pixels disposed therebetween and immediately surrounding each group of light-sensing pixels in every direction from a planar perspective;
a plurality of microlenses interspersed two dimensionally on a plane opposed to the pixel region such that each of the plurality of microlenses is aligned with, from the planar perspective, at least one of light-sensing pixels and none of the plurality of microlenses is aligned with, from the planar perspective, one of the light-emitting pixels;
an image processing section configured to perform image processing on image pickup data obtained when the light-sensing pixels image the scene and to produce therefrom two sets of parallax image data, each including data from respectively corresponding light-sensing pixels from each of the groups; and
a position detection section configured to detect a three-dimensional position of the object, including an xy-position component and a z-position component, where the xy-position component is determined by performing an edge detection process on the image pickup data, and the z-position component is determined based on a phase difference between the two sets of parallax image data by calculating a correlation between the two sets of parallax image data.

9. The input/output device of claim 8, further comprising:
a flat-panel-type lens substrate facially opposed to the pixel region and covering the pixel region from the planar perspective,
wherein the plane upon which the plurality of microlenses are interspersed two dimensionally corresponds to a face of lens substrate covering the pixel region.

10. The input/output device of claim 8,
wherein the plurality of microlenses are each disposed on the at least one of light-sensing pixels with which they are respectively aligned.

11. The input/output device of claim 10,
wherein the light-sensing pixels each include an on-chip lens and the plurality of microlenses are each disposed on the on-chip lens of the at least one of light-sensing pixels with which they are respectively aligned.

12. The input/output device of claim 11,
wherein the plurality of microlenses each include a resin base that is disposed on the on-chip lens of the at least one of light-sensing pixels with which they are respectively aligned.

13. The input/output device of claim 8,
wherein each group of light-sensing pixels includes $N \geq 2$ contiguous light-sensing pixels.

14. The input/output device of claim 13,
wherein the groups of light-sensing elements and the plurality of microlenses have a one-to-one correspondence.

15. The input/output device of claim 14,
wherein each group of light-sensing pixels comprises a 2×2 matrix of contiguous light-sensing pixels and each of the plurality of microlenses covers, from the planar perspective, all of the light-sensing pixels of one of the groups.

16. The input/output device of claim 15,
wherein each set of parallax image data includes data from one pixel from each of the groups that is located in a same position of the 2×2 matrix of the respective group.

17. The input/output device of claim 8,
wherein the light-emitting pixels are LCD pixels.

18. The input/output device of claim 8,
wherein the light-emitting pixels are self-luminous pixels.

19. The input/output device of claim 18,
wherein the light-emitting pixels are organic electroluminescent pixels.

20. An electronic apparatus comprising the input/output device of claim 8.

* * * * *